United States Patent
Grehn et al.

(10) Patent No.: US 6,926,446 B2
(45) Date of Patent: Aug. 9, 2005

(54) RADIAL SELF-ALIGNING ROLLING BEARING

(75) Inventors: Martin Grehn, Dittelbrunn (DE);
Rainer Schroder, Egenhausen (DE)

(73) Assignee: FAG Kugelfischer AG & Co. KG (DE)

(*) Notice: Subject to any disclaimer, the term of this patent is extended or adjusted under 35 U.S.C. 154(b) by 0 days.

(21) Appl. No.: 10/706,887

(22) Filed: Nov. 13, 2003

(65) Prior Publication Data
US 2004/0096132 A1 May 20, 2004

(30) Foreign Application Priority Data
Jun. 10, 2002 (DE) ......................................... 102 25 572

(51) Int. Cl.⁷ ............................................. F16C 19/49
(52) U.S. Cl. ...................... 384/494; 384/495; 384/558
(58) Field of Search ................................ 384/494–497, 384/552, 522, 558, 568

(56) References Cited

U.S. PATENT DOCUMENTS

| 956,676 | A | * | 5/1910 | Bright | 384/552 |
| 1,351,754 | A | * | 9/1920 | Hubard | 384/494 |
| 4,505,523 | A | * | 3/1985 | Stephan | 384/445 |
| 4,799,809 | A | * | 1/1989 | Kuroiwa | 384/522 |

* cited by examiner

Primary Examiner—Thomas R. Hannon
(74) Attorney, Agent, or Firm—Ostrolenk, Faber, Gerb & Soffen, LLP

(57) ABSTRACT

Radial self-aligning rolling bearing including an outer ring, an inner ring, and balls which are arranged to roll in the raceways of the rings, and also spherical rollers together as rolling elements, which are all guided in a cage. The balls are larger in diameter than the spherical rollers, so that the balls exclusively take up the entire bearing load when the bearing load is small and both the balls and the rollers take up a larger bearing load.

7 Claims, 2 Drawing Sheets

RADIAL SELF-ALIGNING ROLLING BEARING

FIELD OF THE INVENTION

The invention relates to a radial self-aligning rolling bearing with both balls and spherical rollers as its rolling elements.

BACKGROUND OF THE INVENTION

Self-aligning roller bearings and spherical roller bearings are used in a large number of radially loaded applications in which an angle fault is to be compensated between the housing and shaft. It is possible to use these bearings for high loads by using the rolling element roller with line contact between the outer ring and inner ring. This bearing becomes problematical if the loading on the rolling bearing becomes too small, because the rows of rollers have the tendency that they no longer move in a rolling fashion but rather slide in the raceways. This sliding of the rolling elements in the raceways is then also associated with a drop in the rotational speed of the cage with the rolling elements. If the loading on the rolling bearing then suddenly increases, the rolling element which then engages between the outer ring and inner ring must accelerate the entire cage with all the other rolling elements to the correct rotational speed within fractions of a second. During this acceleration process, very high forces associated with a high sliding friction are generated which may damage the rolling elements and the raceways of the outer ring and the inner ring. This problem occurs, for example, in applications in which the rolling elements are subject only to a small load during normal operation. If an increase in the load occurs due to interference variables or load peaks, this leads to a situation in which the rolling bearings briefly experience a peak load, and the effect described above possibly occurs.

DE 8803970 U1 describes a radial rolling bearing in which both rollers and balls are used simultaneously together as rolling elements. The problem with this application is that the additional ball is intended to increase the basic bearing load rating of this combined self-aligning ball bearing. However, the problem of the sliding of the rolling elements and of the brief acceleration of an entire row of rollers is not solved with this embodiment.

Furthermore, DE 29 18 601 discloses a cylindrical roller bearing with cylindrical rollers and balls as the roller elements. The problem with this application is that the formation of a groove by the rolling elements is to be avoided when the outer ring and inner ring rotate at the same speed.

OBJECT OF THE INVENTION

The object of the invention is therefore to provide a radial self-aligning rolling bearing which both avoids the rolling elements sliding in the raceway under low loads and also has a sufficient basic bearing load rating to prevent damage under load peaks.

SUMMARY OF THE INVENTION

This object is achieved by selecting the diameters of the balls and spherical rollers in the bearing so that the balls bear a similar load while the balls and rollers together bear a larger load.

The essential core of the invention is that balls and rollers are to be used simultaneously in a radial self-aligning rolling bearing, with the balls having a slightly larger diameter than the rollers. If the balls and rollers are arranged alternately in the circumferential direction, the balls are involved in bearing the radial load when the load is low or small, and the rollers are involved in bearing the radial load in the case of peak loads. The advantage of using the load-bearing balls under minimum loading is that higher Hertzian stresses occur as a result of the point contact between the raceway and ball than when there is line contact between the roller and raceway, and the tendency of the balls and raceways to slide is thus significantly reduced. This effect is also increased by the fact that only half of the rolling elements are now in engagement. As a result of this measure, the roller crown ring, composed of rollers and cage, rotates in the rolling bearing and a drop in the rotational speed of the roller crown ring is prevented. At the moment of a high or peak load, the balls which are of a minimum size are compressed in accordance with their spring characteristic curve so that the rollers then additionally provide support with their line contact. This prevents stresses arising in the bearing, which would lead to a plastic deformation of individual rolling elements. As the rotational speed of the roller crown ring no longer drops, the sudden acceleration forces now also no longer occur, as the rollers now also rotate at the correct rotational speed. The levels of low and high load referred to herein are relative levels with respect to each other, and vary depending on numerous factors, including materials of the rolling elements and the raceways, size of the bearing, size of the expected range of loads, etc.

There is a region in which the diameter between the ball and roller may vary. The value 0.4% constitutes the limit of the difference in size between the diameter of the ball and diameter of the roller. If the ball is 0.4% larger in diameter than the roller, the balls deform plastically under load before the rollers provide their support.

BRIEF DESCRIPTION OF THE DRAWINGS

FIG. 1 shows a radial self-aligning rolling bearing in a 3-dimensional illustration with both balls and rollers as rolling elements.

DETAILED DESCRIPTION OF PREFERRED EMBODIMENTS

Figure 2B:
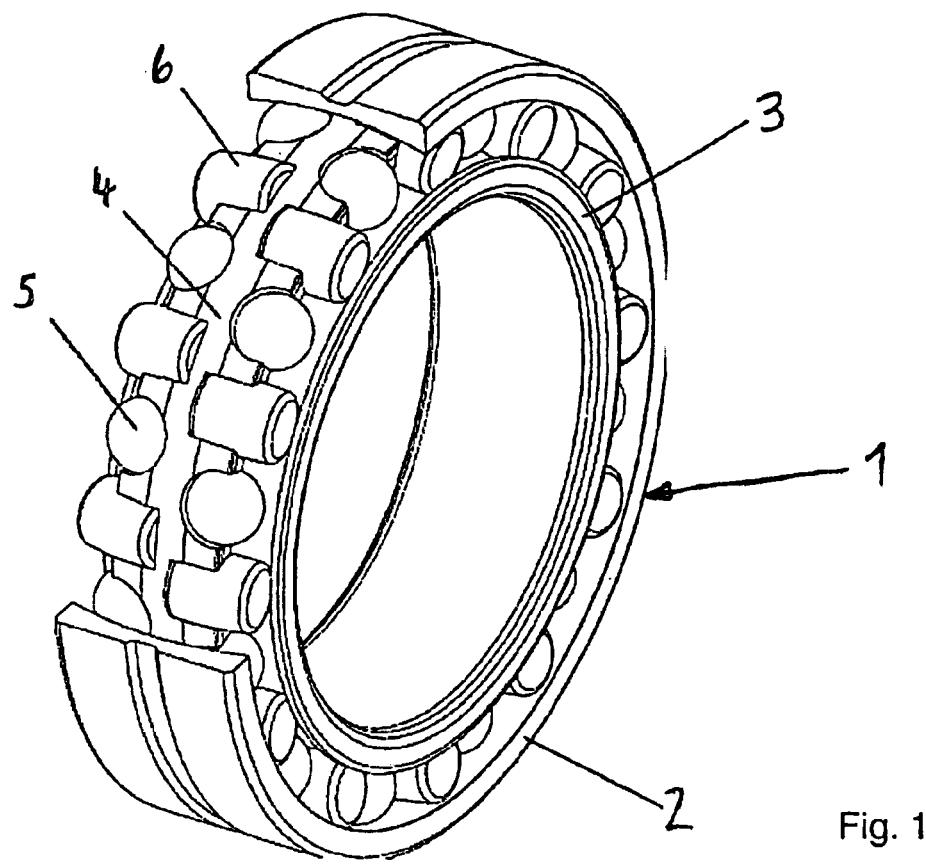
FIG. 2 shows a radial self-aligning rolling bearing in section, in parallel with the axis of rotation of the bearing, with FIG. 2a showing a bearing ball and FIG. 2b showing a spherical roller bearing element.

FIG. 1 shows a preferred embodiment of the radial self-aligning rolling bearing. This Figure shows a self-aligning roller bearing 1 with an outer ring 2, an inner ring 3 and two rows of alternating balls 5 and spherical rollers 6, both as rolling element, arranged between the outer ring and inner ring. All of the rolling elements are guided by a common cage 4 in this illustration. However, a cage which is divided in the circumferential direction and guides each of the two parallel roller/ball raceways individually is also conceivable for special applications. The diameter balls 5 is slightly larger than that of the rollers 6 in diameter particularly at the widest diameter of the rollers. The difference in diameters is selected such that the change over from a smaller load to a higher load on the bearing causes the contact change described below. That should be easily determined for a particular bearing and its application. In this illustration, the rollers 5 and balls 6 are arranged alternately in the circumferential direction.

The diameters of the balls 5 and of the rollers 6 are dimensioned, in accordance with the materials and hardnesses of the rolling elements and the raceways and the expected range of loads on the bearing, such that when the load on the rolling bearing is small, the rollers 6 do not touch both raceways simultaneously while rollers are in rolling contact between two adjacent balls. In this smaller load mode of operation, only the balls 5 support the load, while the rollers 6 roll unloaded in the rolling bearing. Because of the dimensioning of the difference in diameters between the balls 5 and the rollers 6, the balls do not experience any plastic deformation when there is maximum loading of the radial self-aligning rolling bearing.

Figure 3:
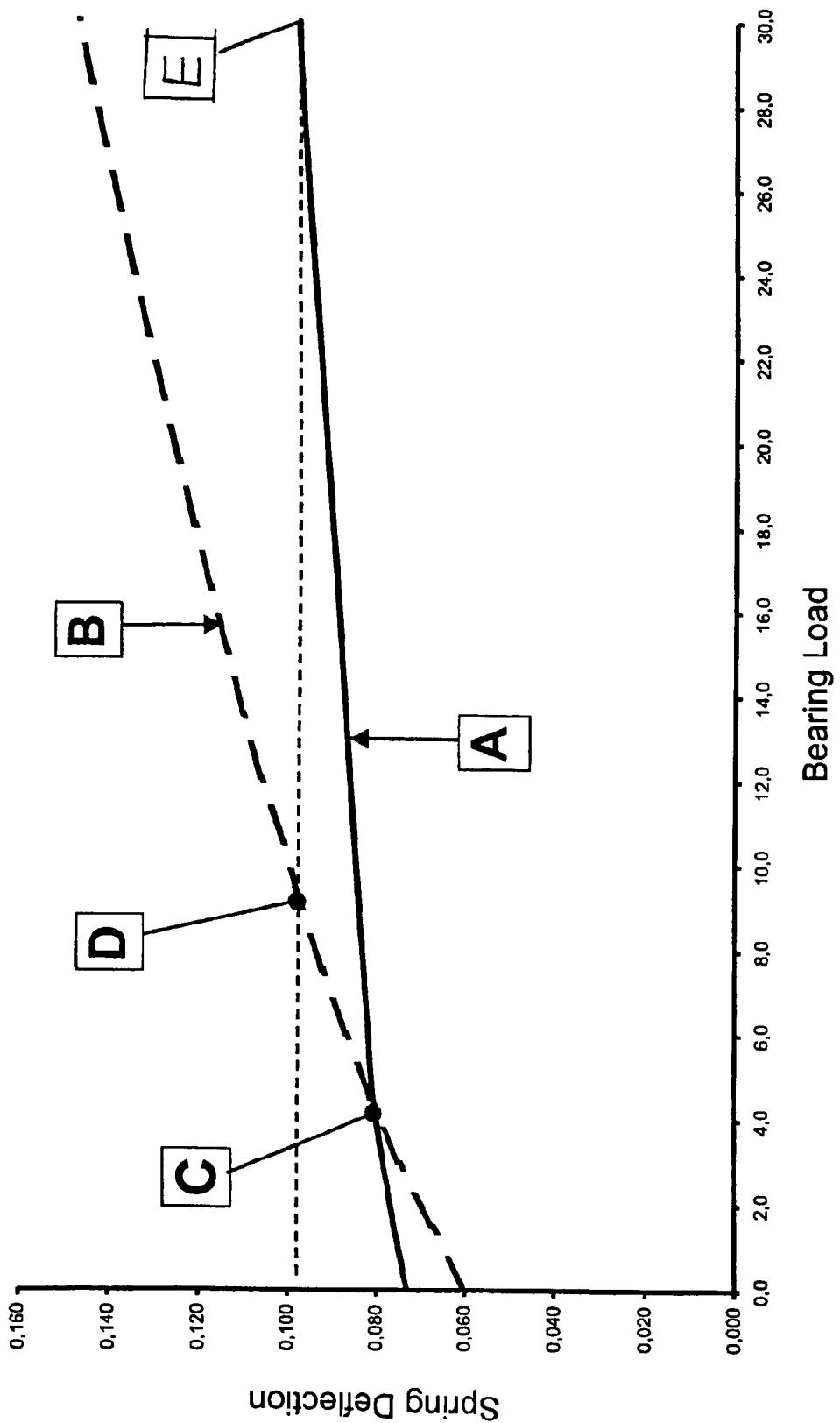
FIG. 3 represents a table of the composite spring characteristic curve.

FIG. 3 shows the interaction between the spring constants of the balls and of the rollers. A possible practical measure of the difference in diameters between the larger balls 5 and the smaller rollers 6 is, for example, two hundredths of a millimeter.

A further embodiment has a plurality of rollers arranged between two balls. However, the shaft runs increasingly less smoothly in the radial direction as the number of load-bearing balls is reduced.

Figure 2A:
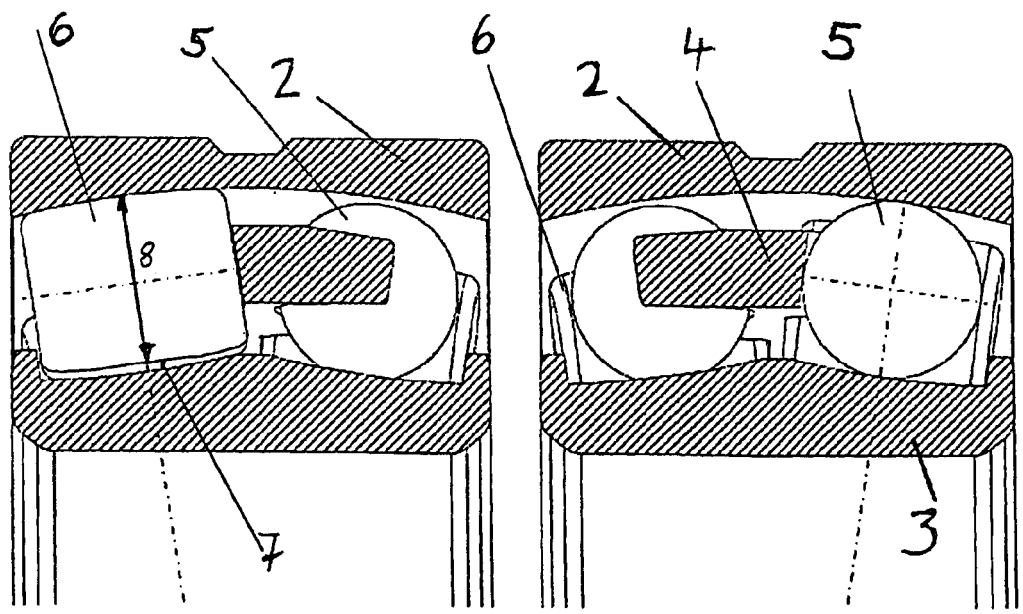

FIG. 2 shows the radial self-aligning rolling bearing in section. The load-bearing ball 5 is illustrated in FIG. 2a when the load is small. The contact situation of a nonload-bearing roller 6 when the load is small is illustrated in FIG. 2b. The difference in diameters is indicated, somewhat exaggerated, in this view in order to clarify the design of the bearing. The difference in diameters is provided with the reference symbol 7 in this Figure.

In FIG. 3, the interplay between the two spring constants is illustrated in an example of a radial self-aligning rolling bearing. The spring constants of the ball 5 are provided with the reference symbol B in the coordinate system, and the spring constants of the roller 6 being provided with the reference symbol A in the coordinate system. The rolling bearing load is illustrated in kN in the ordinate, and the spring path of the bearing or of the shaft in this bearing is illustrated in the abscissa. The spring characteristic curve B of the ball 5 starts in this example at 0.060 mm and a load of 0 kN. The starting point of the line B therefore corresponds to the bearing air between the outer ring, the ball and the inner ring. From 0 kN to 4 kN in this example, the ball exclusively provides the support for the load of the radial self-aligning rolling bearing. In this area, the roller 6 runs without loading. At the point C, the smaller diameter roller 6 starts to pick up the loading of the rolling bearing in addition to the load carrying by the ball 5. Maximum spring deflection of the radial self-aligning rolling bearing is shown as 0.1 mm in this example (point B, E). This spring deflection corresponds to a bearing load of 30 kN. The range of the spring characteristic curve B of the ball 5 which lies above 0.1 mm is a theoretical range which would occur if no rollers were providing support in this bearing.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A radial self-aligning rolling bearing comprising:

an outer bearing ring; an inner bearing ring radially inward of the outer bearing ring, with the outer ring defining an outer raceway facing the inner ring and the inner ring defining an inner raceway facing the outer raceway;

rolling elements, comprising:

a plurality of bearing balls disposed between the rings and arranged around the raceways to roll in the raceways; and a plurality of spherical bearing rollers as rolling elements also disposed between the rings and rollable around the raceways, the rollers having a widest diameter;

a bearing cage disposed between the rings, and the rolling elements being guided along the raceways in the cage;

the bearing balls being larger in diameter than the widest diameter of the spherical rollers for enabling the balls to exclusively take up the entire rolling bearing load on the bearing when the bearing load is small.

2. The radial self-aligning rolling bearing of claim 1, wherein the balls and the spherical rollers are alternatively arranged in the circumferential direction around the raceways.

3. The radial self-aligning rolling bearing of claim 2, wherein each ball alternates with rollers on both sides and each roller alternates with balls on both sides in the circumferential direction.

4. The radial self-aligning rolling bearing of claim 1, wherein the balls and rollers are so sized and the balls and the raceways are so comprised that under relatively high load, both the balls and the rollers take up the rolling bearing load.

5. The radial self-aligning rolling bearing of claim 1, wherein the bearing has two rows of the rolling elements, and a respective outer raceway and a respective inner raceway on the outer and inner rings, respectively, for each of the rows of balls and rollers as rolling elements.

6. The radial self-aligning rolling bearing of claim 5, further comprising a single common cage for the rolling elements in each of the raceways.

7. The radial self-aligning rolling bearing of claim 1, wherein the diameter of the ball is between 0.01 percent and 0.4 percent larger than the diameter of the roller.

* * * * *